United States Patent
Gonzales, Jr.

(10) Patent No.: US 10,108,160 B2
(45) Date of Patent: Oct. 23, 2018

(54) RE-CREATING AN INTERNAL SHAPE OF A CLOTHING ITEM

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 410 days.

(21) Appl. No.: 14/867,470

(22) Filed: Sep. 28, 2015

(65) Prior Publication Data

US 2016/0018804 A1    Jan. 21, 2016

Related U.S. Application Data

(63) Continuation of application No. 13/724,249, filed on Dec. 21, 2012, now Pat. No. 9,173,453.

(51) Int. Cl.
| | |
|---|---|
| *A43D 3/04* | (2006.01) |
| *A43D 119/00* | (2006.01) |
| *G05B 15/02* | (2006.01) |
| *G06Q 30/06* | (2012.01) |

(52) U.S. Cl.
CPC .............. *G05B 15/02* (2013.01); *A43D 3/04* (2013.01); *A43D 119/00* (2013.01); *G06Q 30/0631* (2013.01); *A43D 2200/10* (2013.01); *A43D 2200/60* (2013.01)

(58) Field of Classification Search
CPC .... A43D 3/04; A43D 119/00; A43D 2200/10; A43D 2200/60; G05B 15/02; G06Q 30/0631
USPC ............... 702/39, 167, 182, 188; 264/223
See application file for complete search history.

(56) References Cited

U.S. PATENT DOCUMENTS

| | | | |
|---|---|---|---|
| 1,791,948 A | 2/1931 | Bliss | |
| 1,915,574 A | 6/1933 | Harry | |
| 2,135,853 A | 11/1938 | Slizus et al. | |
| 2,538,247 A | 1/1951 | Wormald | |
| 5,222,312 A | 6/1993 | Doyle | |
| 5,539,677 A | 7/1996 | Smith | |
| 6,289,743 B1 | 9/2001 | Norton | |
| 6,918,695 B2 | 7/2005 | Polegato Moretti et al. | |
| 6,957,165 B2 | 10/2005 | Gislason | |
| 1,048,826 A1 | 12/2012 | Grune | |
| 9,173,453 B2 | 11/2015 | Gonzales, Jr. | |
| 2002/0023306 A1 | 2/2002 | Sajedi et al. | |
| 2005/0116380 A1 * | 6/2005 | Tadin | A43B 7/28 264/223 |

(Continued)

OTHER PUBLICATIONS

"U.S. Appl. No. 13/724,249, Notice of Allowance dated May 27, 2015", 6 pgs.

(Continued)

*Primary Examiner* — Bryan Bui
(74) *Attorney, Agent, or Firm* — Schwegman Lundberg & Woessner, P.A.

(57) ABSTRACT

A machine may be configured to re-create an internal shape of a clothing item using a pneumatically-powered fitting device. For example, the machine, based on a clothing item identifier, identifies a description of an internal shape of a clothing item. The machine transmits an instruction referencing the description to a filling station associated with the fitting device. The machine, based on the transmitting of the instruction, causes the fitting device to adjust according to the description.

20 Claims, 7 Drawing Sheets

(56) References Cited

U.S. PATENT DOCUMENTS

| | | | |
|---|---|---|---|
| 2008/0195008 A1 | 8/2008 | Davis | |
| 2011/0030154 A1 | 2/2011 | Yoon et al. | |
| 2011/0099122 A1* | 4/2011 | Bright | G06Q 10/04 705/348 |
| 2013/0291317 A1 | 11/2013 | Hanson et al. | |
| 2014/0163664 A1* | 6/2014 | Goldsmith | A61B 17/00491 623/1.11 |
| 2014/0180866 A1 | 6/2014 | Gonzales | |
| 2014/0223671 A1 | 8/2014 | Fisher et al. | |

OTHER PUBLICATIONS

"U.S. Appl. No. 13/724,249, Notice of Allowance dated Jul. 1, 2015", 5 pgs.

"Clinical Policy Bulletin:Intermittent Pneumatic Compression Devices", Copyright 2001-2013 Aetna Inc., [Online]. Retrieved from the Internet: <URL: http://www.aetna.com/cpb/medical/data/500_599/0500.html>, (Accessed Mar. 21, 2013), 12 pgs.

"Get Your Converse Shoes on Virtually Using Augmented Reality", © 2012 DigitalAnalog—An Online Publication for Creativity + Code., [Online]. Retrieved from the Internet: <URL: http://digitalanalog.in/2011/03/14/get-your-converse-shoes-on-virtually-using-augmented-reality/>, (Mar. 14, 2011), 7 pgs.

"JAK Appleton: Shoe Manufacturing Philippines", Copyright © 2006 JAK Appleton Group Inc., [Online]. Retrieved from the Internet: <URL: http://www.jakappleton.com/shoe-manufacture.html>, (Accessed Dec. 20, 2012), 5 pgs.

"Pressure Regulator", Wikipedia, the free encyclopedia, [Online]. Retrieved from the Internet: <URL: http://en.wikipedia.org/wiki/Pressure_regulator, (Accessed Dec. 19, 2012), 5 pgs.

"Pressure sensor", From Wikipedia, the free encyclopedia, [Online]. Retrieved from the Internet: <URL: http://en.wikipedia.org/wiki/Pressure_sensor>, (Accessed Dec. 19, 2012), 7 pgs.

"She Last Chart", [Online]. Retrieved from the Internet: <URL: 11.http://www.newbalance.com/shoe-last-chart/shoe-last-chart,default,pg.html>, (Accessed Dec. 20, 2012), 2 pgs.

"Shoe Last Model Maker: Professional Expertise for Technical Consulting", [Online]. Retrieved from the Internet: <URL: http://www.gigiagostini.it/Gigi_Agostini_shoelast_Model_Maker/Welcome.html>, (Accessed Dec. 20, 2012), 3 pgs.

"The Future of Shopping Is Here", Copyright © 2012 Simply Zesty, [Online]. Retrieved from the Internet: <URL: http://www.simplyzesty.com/advertising-and-marketing/the-future-of-shopping-is-here-video/>, (Jun. 12, 2012), 9 pgs.

"Trying on Shoes Made Easy at the Adidas Shop in Paris", © 2012 Sugar Inc.—Insanely Addictive™, [Online]. Retrieved from the Internet: <URL: http://www.geeksugar.com/Trying-Shoes-Made-Easy-Adidas-Shop-Paris-159420>, (Mar. 6, 2007), 5 pgs.

"What is a Shoe Last?", © Copyright 1981-Present. ShoeSchool.com., [Online]. Retrieved from the Internet: <URL: http://www.shoeschool.com/shoeschool/lasts/shoe_lasts_what.html>, (Accessed Dec. 20, 2012), 3 pgs.

Delman, Matthew, "How Pneumatic Systems Work", eHow.com, [Online]. Retrieved from the Internet: <URL:http://www.ehow.com/how-does_4970327_pneumatic-systems-work.html>, (Acessed Dec. 19, 2012), 5 pgs.

Gill, Pauline, "What Are Pneumatic Systems Used for?", © 1999-2012 Demand Media, Inc., [Online]. Retrieved from the Internet: <URL: http://www.ehow.com/about_5407208_pneumatic-systems-used-for_.html>, (Accessed Dec. 20, 2012), 5 pgs.

Sanchez, Collene, "How to Calculate Gas Volume", eHow.com, [Online]. Retrieved from the Internet: <URL:http://www.ehow.com/how_7567041_calculate-gas-volume.html>, (Accessed Dec. 19, 2012), 5 pgs.

* cited by examiner

RE-CREATING AN INTERNAL SHAPE OF A CLOTHING ITEM

CLAIM OF PRIORITY

The present application is a continuation of and claims the benefit of priority under 35 U.S.C. § 120 to U.S. patent application Ser. No. 13/727,249 entitled "METHODS AND SYSTEMS TO RE-CREATE AN INTERNAL SHAPE OF A SHOE," filed on Dec. 21, 2012, which is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2012-2015, All Rights Reserved.

TECHNICAL FIELD

The present application relates generally to the technical field of data processing and, in one specific example, to methods and systems to mimic an internal shoe shape.

BACKGROUND

Shoe shopping may involve a person trying on shoes to determine if particular shoes fit that person. Today, many businesses engaging in electronic commerce ("e-commerce sites") allow users to buy shoes online, try on the shoes at home, and return them to the e-commerce site or a brick-and-mortar store if they do not fit. It is not uncommon for the online shoe buyers to return or exchange the shoes online because the shoes did not fit properly. Some shoppers buy the selected shoes in several sizes to have the option to choose between different pairs in order to avoid wasting time returning, re-ordering, or exchanging shoes. Accordingly, the problems of increased expense and expended time may lead to frustrated shoe shoppers who may choose to avoid online shoe shopping altogether.

BRIEF DESCRIPTION OF THE DRAWINGS

Some embodiments are illustrated by way of example and not limitation in the figures of the accompanying drawings in which.

DETAILED DESCRIPTION

Figure 1:
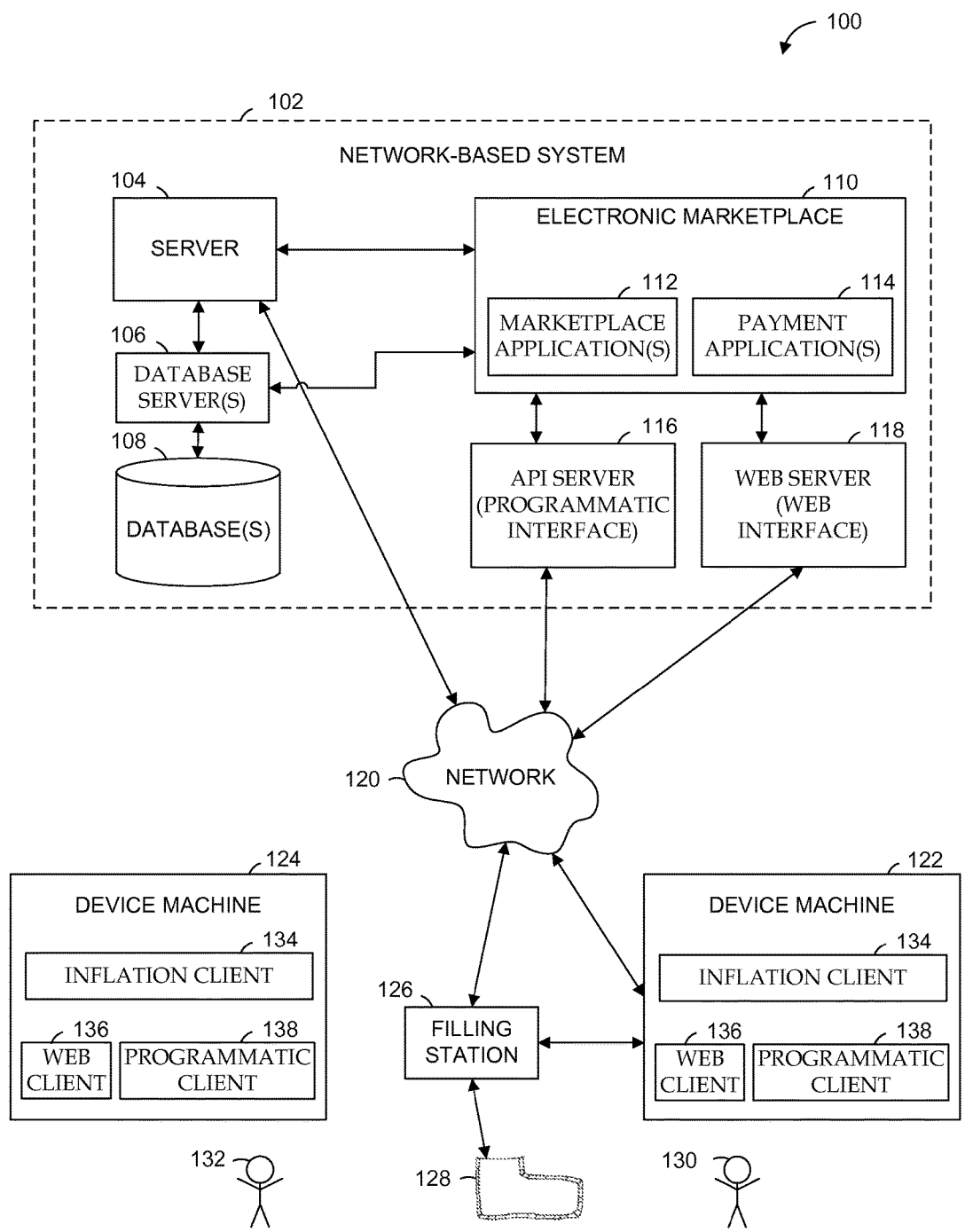
FIG. 1 is a network diagram depicting a network environment, within which various example embodiments may be deployed.

Example methods and systems to re-create an internal shape of a shoe using a pneumatically-powered inflatable sock are described. In the following description, for purposes of explanation, numerous specific details are set forth in order to provide a thorough understanding of example embodiments. It will be evident, however, to one skilled in the art, that the present subject matter may be practiced without these specific details.

The subject matter described herein may allow a user of a system (e.g., a consumer or an end user of the shoe) to determine if a selected shoe is likely to fit the user without having the actual shoe in his or her possession. The system may comprise a pneumatically-powered inflatable sock (also "sock") that may be inflated to mimic the internal shape of a selected shoe based on data describing the internal shape of the selected shoe. The user may wear (e.g., pull on or try on) the inflatable sock to judge whether the selected shoe fits the user as desired. In some example embodiments, the subject matter described herein may be used to determine whether a selected clothing item (e.g., a hat or glove) is likely to fit the user without having the actual clothing item in his or her possession.

The presently described system, upon receiving the shoe identification of a selected shoe, may access a description of the internal shape of the selected shoe and provide instructions to inflate the sock. The sock may be in a deflated state, an inflated state, or a partially inflated state. When the sock is inflated (e.g., in the inflated state), the inner cavity of the sock may mimic the internal shape of the selected shoe. A user may try on the inflated sock to test whether the selected shoe fits his or her foot properly without having the actual shoe in his or her possession. If the user is satisfied with the fit of the sock inflated to the specifications of the selected shoe, the user may be more likely to select an option to purchase the selected shoe.

In some example embodiments, the sock may have a number of fillable chambers which may be inflated or deflated to allow the inside of the sock to achieve the fit and form of any internal configuration of a shoe. To inflate the fillable chambers, the system may fill them with a fluid (e.g., gas or liquid). Each fillable chamber may not be in fluid communication with the other fillable chambers. Also, each fillable chamber may be filled with a respective fill per chamber independently of the other fillable chambers. In various example embodiments, by varying the fluid pressure per chamber for each of the chambers that may be part of the sock, the system may vary the space inside the inflated sock to re-create (e.g., to mimic) the inside shape of a particular selected shoe.

In various example embodiments, the system may receive a shoe identifier that identifies a shoe product (e.g., footwear) by a manufacturer, a model, and a size of the shoe product. The shoe identifier may be received from a user who may have selected the shoe on an e-commerce site, for example, by clicking on a description of the shoe product. In some example embodiments, the shoe identifier may be received from a sales assistant in a brick-and-mortar store who may be helping a potential customer interested in buying a shoe product online. Based on the received shoe identifier, the system may identify a shoe last (e.g., a shoe mold) used to manufacture a shoe. A shoe last is a model of a foot used in the design and manufacture of mass produced shoes. The system may access a description of the dimensions (e.g., measurements) of the shoe last, the description being expressed as a set of fills per chamber of a sock that has a plurality of fillable chambers. The set of fills per chamber may be determined based on a displacement of an inner wall of the sock when the fillable chambers are in an inflated state. Upon accessing the description of the dimensions of the shoe last, the system may transmit an instruction to cause the plurality of fillable chambers to inflate according to the accessed description. In some example embodiments, when each chamber has inflated based on the respective fill per chamber, the user may position the inflated sock on the user's own foot to experience the fit of the particular selected shoe.

FIG. 1 is a network diagram depicting a network environment 100, within which various example embodiments may be deployed. The network environment 100 is suitable for re-creating an internal shape of a shoe using a pneumatically-powered inflatable sock, according to some example embodiments. The network environment 100 has a client-server architecture. The network environment 100 includes a server 104, a database server 106, a database 108, an electronic marketplace 110, an Application Program Interface (API) server 116, a web server 118, device machines 122 and 124, and a filling station 126. Although two device machines 122 and 124 are shown in FIG. 1, more or less than two device machines may be included in the network environment 100. In some example embodiments, the database 108 may house data that pertains to shoe products (e.g., type, sizes, identifiers of shoe lasts, dimensions of shoe lasts, and fills per chamber of an inflatable sock).

As shown in FIG. 1, some or all of the server 104, the database server 106, the database 108, the electronic marketplace 110, the API server 116, and the web server 118 may form all or part of a network-based system 102. The server 104, the database server 106, the database 108, the electronic marketplace 110, the API server 116, the web server 118, the device machines 122 and 124, the filling station 126, and the sock 128 may each be implemented in a computer system, in whole or in part, as described below with respect to FIG. 7. The network-based system 102 may communicate in a client-server architecture with clients. The network-based system 102 may provide server-side functionality, via a network 120 (e.g., the Internet or Wide Area Network (WAN)), to one or more clients and devices. FIG. 1 illustrates, for example, one or more of an inflation client 134, a web client 136 (e.g., a browser), or a programmatic client 138 executing on device machines 122 and 124.

Each of the device machines 122 and 124 comprises a computing device that includes at least a display and communication capabilities to communicate with the network 120 to access the network-based system 102. For example, the device machines 122 and 124 may be general purpose computers, desktop computers, work stations, multi-processor systems, microprocessor-based or programmable consumer electronics, game consoles, set-top boxes, network PCs, mini-computers, vehicle computers, laptops, navigational devices, portable devices, Internet appliances, hand-held devices, wireless devices, wearable computers, cellular or mobile phones, portable digital assistants (PDAs), smart phones, tablets, ultrabooks, or netbooks. Each of the device machines 122 and 124 may connect with the network 120 via a wired or wireless connection.

The network 120 may be any network that enables communication between or among machines, databases, and devices (e.g., the server 104 and the device machine 122). Accordingly, the network 120 may be a wired network, a wireless network (e.g., a mobile or cellular network), or any suitable combination thereof. The network 120 may include one or more portions that constitute a private network, a public network (e.g., the Internet), or any suitable combination thereof.

Also shown in FIG. 1 are users 130 and 132. One or both of the users 130 and 132 may be a human user (e.g., a human being). The user 130 is not part of the network environment 100, but is associated with the device machine 122 and may be the user of the device machine 122. Likewise, the user 132 is not part of the network environment 100, but is associated with the device machine 124 and may be the user of the device machine 124.

Also shown in FIG. 1 is the filling station 126 and a pneumatically-powered inflatable sock (also the "sock") 128. The network environment 100 may include one or more filling stations 126. In some example embodiments, the filling station 126 may be part of the device machine 122. In other example embodiments, the filling station 126 may be external to the device machine 122. The filling station 126 may communicate with the network 120 or the device 122, or both, via a wired or wireless connection. In various example embodiments, the filling station 126 may receive a communication (e.g., an instruction) from the server 104, via the inflation client 134 on the device machine 122. The instruction may command the filling station 126 to inflate the inflatable sock 128 in order to re-create the internal shape of a shoe. In other example embodiments, the filling station 126 may receive the instruction from the server 104 directly via the network 120. In some example embodiments, the instruction sent by the server 104 and received by the filling station 126 comprises a description of the dimensions of a shoe last used to manufacture the shoe whose internal shape may be re-created by inflating the inflatable sock 128. The inflatable sock 128 may include a plurality of fillable chambers. The description of the dimensions of the shoe last 128 may be expressed as a set of fills per chamber of the inflatable sock 128 having the plurality of fillable chambers. In certain example embodiments, the server 104 may access the database 108 via the database server 106 to obtain the fills per chamber data that pertain to the shoe last, which fills per chamber may be included in the instruction transmitted to the filling station 126.

Also shown in FIG. 1 are an API server 116 and a web server 118. The API server 116 and the web server 118 are coupled to, and provide programmatic and web interfaces respectively to the electronic marketplace 110. The electronic marketplace 110 hosts one or more marketplace applications 112 and payment applications 114. The electronic marketplace 110 is, in turn, shown to be coupled to one or more databases servers 106 that facilitate access to one or more databases 108.

The marketplace applications 112 may provide a number of marketplace functions and services to users 130 and 132 that access the network-based system 102. In some example embodiments, the marketplace applications 112 may allow a user 130 to virtually view (e.g., using an augmented reality application on a mobile phone) an external look of a selected shoe (e.g., as virtually worn by the user 130) without having the selected shoe in his or her possession. The payment applications 114 may likewise provide a number of payment services and functions to users 130 and 132. In various example embodiments, the payment applications 114 may allow user 130 to accumulate value (e.g., in a commercial currency, such as the U.S. dollar, or a proprietary currency, such as "points") in accounts, and then later to redeem the accumulated value for products (e.g., goods or services) that are made available via the marketplace applications 112. While the marketplace and payment applications 112 and 114 are shown in FIG. 1 to both form part of the network-based system 102, it will be appreciated that, in alternative embodiments, the payment applications 114 may form part of a payment service that is separate and distinct from the network-based system 102.

Further, while the network environment 100 shown in FIG. 1 employs a client-server architecture, the present subject matter is of course not limited to such an architecture, and could equally well find application in a distributed, or peer-to-peer, architecture system, for example. The various marketplace and payment applications 112 and 114 could also be implemented as standalone software programs, which do not necessarily have networking capabilities.

Also shown in FIG. 1 are the web client 136 and the programmatic client 138 executing on device machines 122 and 124. The web client 136 accesses the various marketplace and payment applications 112 and 114 via the web interface supported by the web server 118. Similarly, the programmatic client 138 accesses the various services and functions provided by the marketplace and payment applications 112 and 114 via the programmatic interface provided by the API server 116. The programmatic client 138 may, for example, be a seller application (e.g., the TurboLister application developed by eBay Inc., of San Jose, Calif.) to enable sellers to author and manage listings on the network-based system 102 in an off-line manner, and to perform batch-mode communications between the programmatic client 138 and the network-based system 102. In some example embodiments, the programmatic client 138 may be a buyer application to enable a user 130 to buy a shoe product using the electronic marketplace 110 after the user 130 has tested the fit of the shoe product with the inflatable sock 128.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

Figure 2:
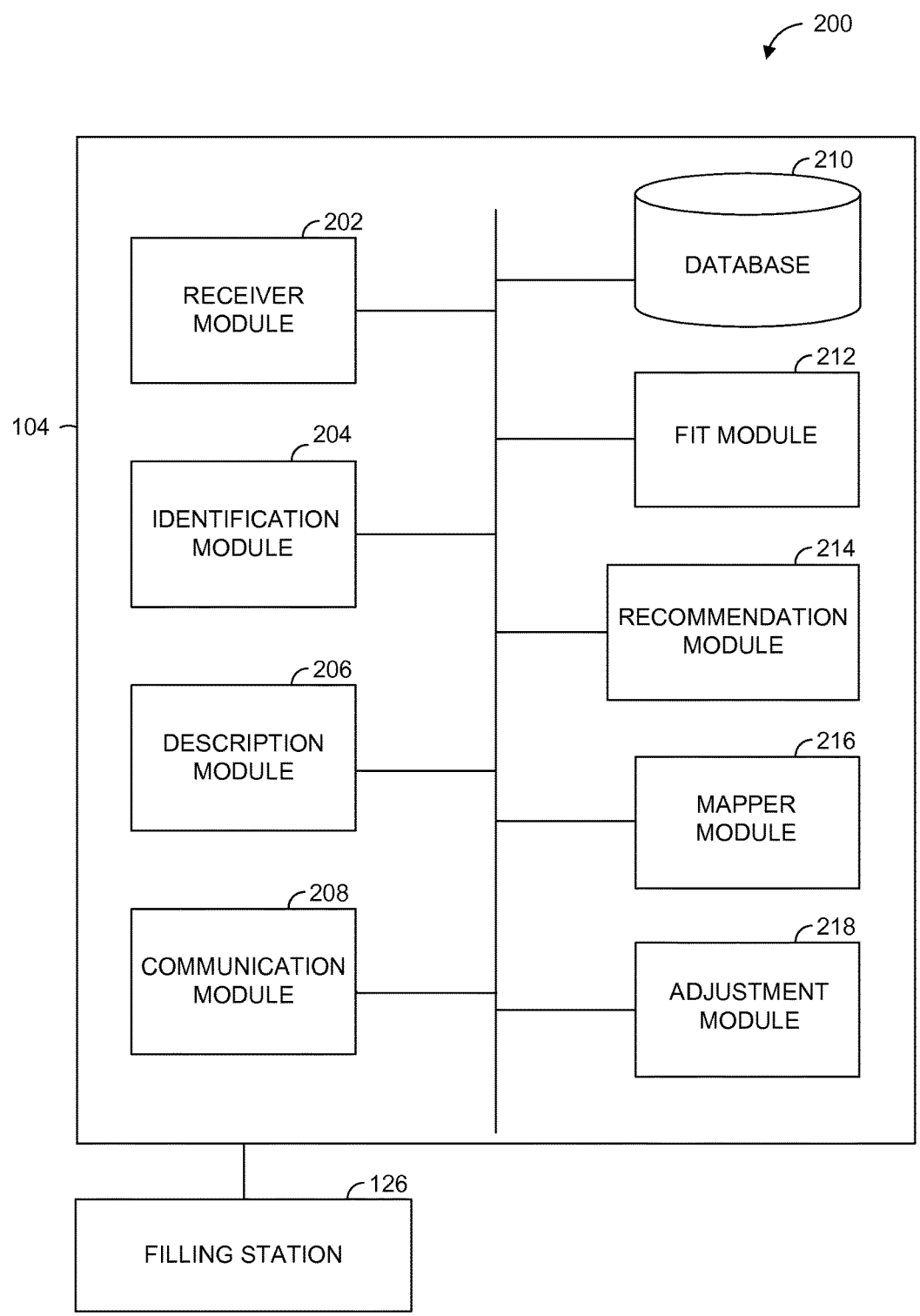
FIG. 2 is a block diagram of an example system, according to various example embodiments.

FIG. 2 is a block diagram of an example system, according to various example embodiments. For example, system 200 may be used to re-create the internal shape of a shoe using a pneumatically-powered inflatable sock 128 (see FIG. 1) and, accordingly, is described by way of example with reference to FIG. 1.

The system 200 is shown to include a number of modules that may be in communication with each other. One or more modules of the system 200 may reside on a server, client, or other processing device. One or more modules of the system 200 may be implemented or executed using one or more hardware processors. In some example embodiments, one or more of the depicted modules are implemented on the server 104. In FIG. 2, the server 104 is shown as including a receiver module 202, an identification module 204, a description module 206, a communication module 208, a database 210, a fit module 212, a recommendation module 214, a mapper module, and an adjustment module 218 configured to communicate with each other (e.g., via a bus, shared memory, or a switch). Also shown in FIG. 2 is the filling station 126.

A receiver module 202 is configured to receive a shoe identifier that identifies a shoe product by manufacturer, a model, and a size of the shoe product. In some example embodiments, the shoe identifier may be received at the receiver module 202 as a result of the user 130 selecting (e.g., clicking on) the image of a shoe product displayed by a marketplace application 112 or capturing a bar code using the web client 136 or the programmatic client 138. For example, the shoe product image may be displayed in a description of a shoe product in a graphical user interface on the user 130's cellular phone or another device.

Upon receiving data describing the user 130's selection of a shoe product (e.g., manufacturer, model, and size), which selection may be expressed as a shoe identifier, the receiver module 202 may store the shoe identifier or any other data received from the user 130, or both, in database 210. In some example embodiments, the stored data may be used to analyse the user 130's preferences or to make recommendations to the user 130. The database 210 may store data that pertains to a shoe product (e.g., the shoe product identifier (ID), manufacturer, model(s), size(s), color(s), width(s), identifier of the shoe last used to manufacture the shoe product, dimensions of the shoe last, and a set of fills per chamber that corresponds to the dimensions of the shoe last). The database 210 may be accessed by one or more of the system 200 modules to either retrieve or store data, or both.

An identification module 204 is configured to identify a shoe last used to manufacture the shoe product, based on a selected shoe identifier. A shoe manufacturer may use a particular shoe last (e.g., shoe mold) to manufacture a particular model of a shoe in a particular size. For example, the construction of a shoe that includes arranging (e.g., molding) the shoe leather around a shoe last may allow the internal cavity of the constructed shoe to mimic the shape of the shoe last. Although a different shoe last may be used to manufacture a different size shoe of the same model, a same shoe last may be used to manufacturer different shoe models, as long as the different shoe models share certain characteristics (e.g., the different shoe models are similar style pumps). Accordingly, the database 210 may include a record that correlates a shoe identifier to a shoe last identifier, which shoe last identifier identifies the shoe last used to manufacture the shoe product identified by the shoe identifier. Also, the database 210 may include a record that correlates a shoe last identifier to all the shoe identifiers that identify all the shoe models in a particular size that were manufactured by a particular manufacturer.

A description module 206 is configured to access a description of the dimensions of the shoe last, which description is expressed as a set of fills per chamber of a sock 128 having a plurality of fillable chambers. The description of the dimensions of the shoe last may be stored in a record in the database 210. In some embodiments, a record in the database 210 may correlate a shoe last identifier to a set of fills per chamber of an inflatable sock 128 having a plurality of fillable chambers. Accordingly, the fills per chamber that make up the descriptions of the dimensions of different shoe lasts may vary to account for the differences between the shapes of the different shoe lasts.

As described above, the inflatable sock 128 may have a deflated state, an inflated state, and a partially inflated state. Inflating each fillable chamber of the sock 128 according to a respective fill per chamber may cause an inner wall of the sock 128 to be displaced in a way that may allow the inner wall to take the shape of a particular shoe last. The set of fills per chamber may be determined based on the displacement of the inner wall of the sock 128 when the fillable chambers are in an inflated state, as described with respect to FIGS. 6A and 6B.

A communication module 208 is configured to transmit an instruction to the filling station 126 to cause the filling station 126 to inflate the plurality of fillable chambers according to the accessed description of the dimensions of the identified shoe last. In some example embodiments, the instruction includes the description of the shoe last. In certain example embodiments, the instruction may cause the filling station 126 to retrieve the description of the dimensions of the shoe last.

As described above, the plurality of fillable chambers may not be in fluid communication with each other. Each fillable chamber may be filled with a corresponding fill per chamber independently of the other fillable chambers. By controlling the fluid pressure in each chamber independently of the other chambers, the system may vary the space inside the inflated (or partially-inflated) sock 128 to re-create the inside shape of a particular shoe. Furthermore, if it is determined that the user 130 may need a different size shoe than initially selected, the filling station 126 may adjust the fluid pressure per chamber in response to receiving a further instruction including a further description of the dimensions of a shoe last (e.g., a different shoe last for a different size shoe).

In some example embodiments, the receiver module 202 may receive a user-specified characteristic of a fit of a part of the sock 128 in relation to a part of the foot of the user 130. For example, when wearing the inflated sock, the user 130 may determine that the heel of the sock 128 is loose or the toe box is tight. The receiver module 202 may receive a communication comprising user feedback in regards to the fit of the inflated sock. The communication may comprise a user-specified characteristic of the fit (e.g., the heel is too loose or the toe box is too tight). Based on the received user-specified characteristic, the identification module 204 may identify a further shoe last that corresponds to the user-specified characteristic. For example, if the toe box is too tight, the identification module 204 may identify a shoe last for the same shoe model and size but in a wider fit. In some example embodiments, the identification module 204 may access database 210 to identify the further shoe last that corresponds to the user-identified characteristic. Upon the identification module 204 identifying a further shoe last, the description module 206 may access a further description of the dimensions of the further shoe last. Then, the communication module 208 may transmit a further instruction (e.g., to the filling station 126) to cause the plurality of fillable chambers to inflate according to the accessed further description. Accordingly, the instruction may comprise a further set of fills per chamber that corresponds to the further description of the dimensions of the further shoe last. Based on the further instruction, the filling station 126 may inflate the plurality of chambers of the sock 128 according to the further description to re-create the internal shape of a shoe that corresponds to (e.g., was manufactured according to) the further shoe last.

A fit module 212 is configured to determine that a measured distance (e.g., measured by a distance sensor) between a point on the foot of the user 130 wearing the inflated sock 128 and a second point on the inner wall of the inflated sock 128 is outside a range of values indicating a comfortable fit in the area of the first and second points. The fit module 212 may also compare the measured distance and a second range of values indicating a comfortable fit corresponding to a further shoe last. The fit module 212 is further described with respect to FIG. 3.

A recommendation module 214 is configured, based on feedback received from the user 130, to recommend one or more shoe products. The recommendation module 214 is further described with respect to FIG. 3.

A mapper module 216 is configured to map a part of the sock 128 to one or mode fillable chambers of the inflatable sock 128. The mapper module 216 is further configured to map an identified shoe last to one or more shoe products. The mapper module 216 is further described with respect to FIG. 3.

An adjustment module 218 is configured to determine a degree of adjustment for each fill per chamber of one or more fillable chambers based on a communication that pertains to a fit of the inflated sock 128 to the foot of the user 130. The adjustment module 218 is further described with respect to FIG. 3.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 3:
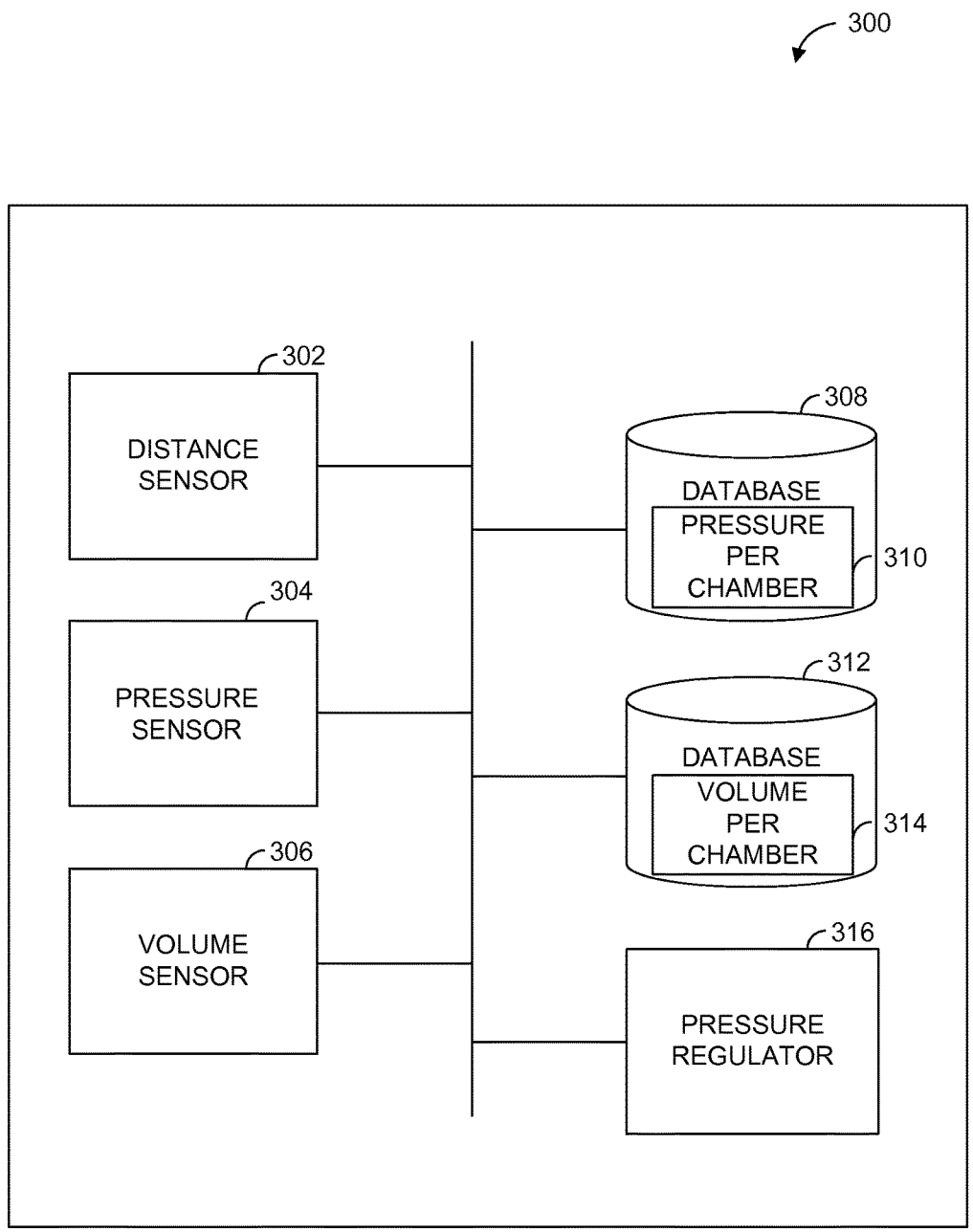
FIG. 3 is a block diagram of certain modules of an example system, according to various example embodiments.

FIG. 3 is a block diagram 300 of certain modules of an example system, according to various example embodiments. The system 300 is shown to include a number of modules that may be in communication with each other. One or more modules of the system 300 may reside on a server, client, or other processing device. One or more modules of the system 300 may be implemented or executed using one or more hardware processors. The filling station 126 or the inflatable sock 128, or both, may include one or more sensors to monitor volume per chamber or pressure per chamber of the plurality of the fillable chambers of the inflatable sock 128. Further, the filling station 126 or the inflatable sock 128, or both may include one or more sensors to measure a distance between a point on the foot of the user 130 wearing the inflated sock 128 and another point on the internal wall of the inflated sock 128.

As described above with respect to FIG. 2, a distance sensor 302 is configured to measure the distance between a first point on the foot of the user 130 wearing the inflated sock 128 and a second point on the internal wall of the inflated sock 128. In some example embodiments, the present system may use the measured distance received from the distance sensor 302 to achieve a more comfortable fit of the inflatable sock 128 based on varying the fills per chamber of the plurality of chambers according to a further description of the dimensions of a further shoe last. To that end, the receiver module 202 may be further configured to receive (e.g., from the distance sensor 302) a measured distance between a first point on a foot of a user 130 wearing the sock 128 and a second point on the inner wall of the sock 128. The measured distance may be ascertained when the plurality of fillable chambers are in an inflated state. The fit module 212 may be configured to determine that the received measured distance is outside a range of values indicating a comfortable fit in an area of the first and second points. The range of values indicating a comfortable fit in the area of the first and second points may be accessed (e.g., by the fit module 212) in a database 210 where the range of values indicating a comfortable fit may be stored. Based on determining that the received measured distance is outside the range of values indicating a comfortable fit, the fit module 212 may compare the measured distance to a second range of values indicating a comfortable fit in the area of the first and second points, which second range of values corresponds to a further shoe last. The second range of values indicating a comfortable fit in the area of the first and second points may be accessed (e.g., by the fit module 212) in a database 210 where the second range of values indicating a comfortable fit may be stored.

The description module 206 may be further configured to access a further description of the dimensions of the further shoe last based on the comparison (e.g., the outcome of comparing) of the measured distance and the second range of values. For example, if the comparison of the measured distance and the second range of values shows that the measured distance is smaller than the smallest value of the second range of values, then it is concluded that the current fit is too small (or too tight) and a larger (or wider) fit may be desired. Alternately, if the comparison of the measured distance and the second range of values shows that the measured distance is larger than the largest value of the second range of values, then it is concluded that the current fit is too large (or too wide) and a smaller (or tighter) fit may be desired. In some example embodiments, the further description may be accessed in the database 210. Also, the communication module 208 may be further configured to transmit a further instruction to cause the plurality of fillable chambers of the sock 128 to inflate according to the accessed further description. For example, the filling station 126 may receive the further instruction and may inflate the plurality of fillable chambers based on the accessed further description.

In certain example embodiments, the receiver module 202 is further configured to receive feedback from the user 130. The feedback may regard the fit of the sock 128 in the inflated state. The recommendation module 214 may be configured, based on the received feedback (e.g., that the sock 128 in the inflated state fits well), to recommend one or more shoe products. Because a particular shoe last may be correlated to one or more shoe products manufactured according to the particular shoe last, the recommendation module 214 may, for example, determine all the shoe products manufactured according to the further shoe last and may recommend one or more of the determined shoe products to the user 130. In some example embodiments, the recommendation module 214 may access stored data (e.g., in database 210) that regards the preferences of the user 130 before determining which recommendation to make to the user 130.

In various example embodiments, the present system may request user feedback in regards to the fit of the inflated sock 128 to the foot of the user 130 in order to determine whether to make any adjustments to the fills per chamber based on the received user feedback. To that end, the receiver module 202 is further configured to receive (e.g., from the distance sensor 302) a measured distance between a first point on a foot of the user 130 wearing the sock 128 and a second point on the inner wall of the sock 128. The measured distance may be ascertained when the plurality of fillable chambers are in an inflated state. The fit module 212 may be further configured to determine that the received measured distance is within a range of values indicating a comfortable fit in an area of the first and second points. The range of values indicating a comfortable fit in the area of the first and second points may be accessed (e.g., by the fit module 212) in a database 210 where the range of values indicating a comfortable fit may be stored. The communication module 208 may be further configured to transmit a communication (e.g., to the user 130 or a sales assistant) requesting a response that pertains to a fit of the sock 128 to the foot of the user 130.

Also, in certain example embodiments, the receiver module 202 is further configured to receive the response to the transmitted communication (e.g., from the user 130 or the sales assistant), which response pertains to the fit of a part of the sock 128. For example, the sales assistant who may be helping the user 130 to operate the sock 128 may send a response stating that heel of the sock 128 in an inflated state is too loose for the user 130's foot. The mapper module 216, as described above with respect to FIG. 2, is configured to map the part of the sock 128 to one or more fillable chambers of the sock 128. To perform the mapping operation, the mapper module 216 may access one or more records that correlate a part of the sock 128 to one or more fillable chambers of the sock 128, which one or more records may be stored in database 210. Further, one or more fills per chamber for the one or more chambers of the sock 128 that are correlated to the part of the sock 128 may be accessed (e.g., by the description module 206) in a database 210. The adjustment module 218, as described above with respect to FIG. 2, is configured to determine a degree of adjustment for each fill per chamber of the one or more fillable chambers based on the response to the transmitted communication. For example, the adjustment module 218, based on the received response stating that the heel of the sock 128 in an inflated state is too loose, may determine that one more fillable chambers that correspond to the heel part of the sock 128 may need to be inflated more in order to achieve a tighter fit in the heel part of the sock 128. The degree of adjustment for each fill per chamber of the respective fillable chambers may be determined, in some example embodiments, based on analysing the feedback data in the contents of the received response and the volume per chamber of the respective fillable chambers (e.g., accessed in the database 210). In some example embodiments, the degree of adjustment may be determined based on solely analysing the content of the response. In certain example embodiments, the degree of adjustment may be determined based on analysing the content of the response in relation to similar user objections. The communication module 208 may be further configured to transmit a further instruction to cause the fills per chamber of the one or more fillable chambers to adjust according to the determined degree of adjustment for each fill per chamber of the one or more fillable chambers of the sock 128.

Further, in some example embodiments, the adjustment of the fills per chamber of the one or more fillable chambers may result in achieving a fit which the user 130 may find comfortable. Based on achieving a fit satisfactory to the user 130, the present system may identify one or more shoe products to recommend to the user 130. To that end, the receiver module 202 is further configured to receive an indication (e.g., from the user 130 or a sales assistant) that the fit of the sock 128 is comfortable to the user 130 based on the fills per chamber of the one or more fillable chambers adjusted according to the further instruction. The identification module 204 is further configured to identify a further shoe last based on the adjusted fills per chamber of the plurality of fillable chambers. The mapper module 216 is further configured to map the identified further shoe last to one or more shoe products. The communication module 208 is further configured to transmit a communication to the user 130, which communication includes a recommendation of the one or more shoe products.

A pressure sensor 304 is configured to measure a current pressure per chamber expressed as a ratio of force over the unit area over which the force is distributed. In some example embodiments, the inflatable sock 128 comprises one or more pressure sensors 304. In various example embodiments, the set of fills per chamber that make up the description of the dimensions of the shoe last, as described above with respect to FIG. 2, may be a set of target pressures per chamber of the plurality of fillable chambers. The pressure sensor 304 may transmit the measured current pressure per chamber for one or more fillable chambers, in some example embodiments, to the filling station 126 in order to allow the filling station 126 to regulate the filling of the plurality of chambers, according to the description of the shoe last. The filling station 126 may regulate the filling of each fillable chamber, for example, by comparing the current pressure per chamber with the target pressure per chamber for each fillable chamber and adjusting the pressure per chamber to match the target pressure per chamber for each fillable chamber, according to the set of target pressures per chamber of the fillable chambers accessed by the description module 206 (e.g., in the database 308). Each target pressure per chamber of the plurality of fillable chambers may be stored as a pressure per chamber record 310 in the database 308.

The target pressure per chamber is less than a maximum pressure per chamber. The maximum pressure per chamber of the plurality of fillable chambers may be determined based on a number of factors. One example factor may be the tolerance of the material used to manufacture the fillable chambers. Another example factor may be the highest pressure that an average human foot may tolerate before damage to the foot may occur or may tolerate comfortably. The filling station 126, in one example, may regulate the filling of each chamber up to the maximum pressure per chamber by comparing the current pressure per chamber received from the pressure sensor 304 with the maximum pressure per chamber for each fillable chamber. In another example, the comparison may be performed by the inflation client 134. Once the current pressure per chamber is found to be equal to the maximum pressure per chamber, the filling of the fillable chambers (e.g., by the filling station 126) may stop or, in some instances, the fillable chambers may deflate automatically.

A volume sensor 306 is configured to measure the amount of fluid (gas or liquid) that is filled into each fillable chamber of the plurality of fillable chambers of the inflatable sock 128. In some example embodiments, the inflatable sock 128 comprises one or more volume sensors 306. In various example embodiments, the set of fills per chamber that make up the description of the dimensions of the shoe last, as described above with respect to FIG. 2, is a set of target volumes per chamber of the plurality of fillable chambers. The volume sensor 306 may transmit the measured current volume per chamber for one or more fillable chambers, in some example embodiments, to the filling station 126 in order to allow the filling station 126 to regulate the filling of the plurality of chambers, according to the description of the shoe last. The filling station 126 may regulate the filling of each fillable chamber by comparing the current volume per chamber with the target volume per chamber for each fillable chamber and adjusting the volume per chamber to match the target volume per chamber, according to the set of target pressures per chamber of the fillable chambers accessed by the description module 206 (e.g., in the database 312). Each target pressure per chamber of the plurality of fillable chambers may be stored as a volume per chamber record 314 in the database 312.

A pressure regulator 316 is a valve that may automatically stop the flow of a fluid at a certain pressure. In some example embodiments, the pressure regulator 316 may be used to control the flow of fluid into one or more fillable chambers of the plurality of chambers of the sock 128. In certain example embodiments, when the present system (e.g., the inflation client 134) determines that a maximum pressure per chamber has been reached, the pressure regulator 316 may receive an instruction (e.g., from the inflation client 134) to stop the flow of fluid. Based on the received instruction, the pressure regulator 316 may stop the flow of fluid into the fillable chambers of the sock 126. This may help prevent injury to the user 130, for example, when the system may adjust the fills per chamber, as described above.

In some example embodiments, one or more of the sensors described above may sense that an object (e.g., a foot) is present inside the sock 128 before the sock 128 is inflated. Based on the one or more sensors sensing the object in the sock 128, the filling station 126, in some instances, may not inflate the sock 128. In some example embodiments, the communication module 208 may be further configured to transmit a communication (e.g., to the user 130 or a sales assistant) requesting the removal of the object from the sock 128 before it may be inflated. In certain example embodiments, the communication module 208 may transmit an instruction (e.g., to the filling station 126) to cause the plurality of fillable chambers of the sock 128 to deflate.

Any two or more of these modules may be combined into a single module, and the functions described herein for a single module may be subdivided among multiple modules. Furthermore, according to certain example embodiments, the modules described herein as being implemented within a single machine, database, or device may be distributed across multiple machines, databases, or devices.

Figure 4:
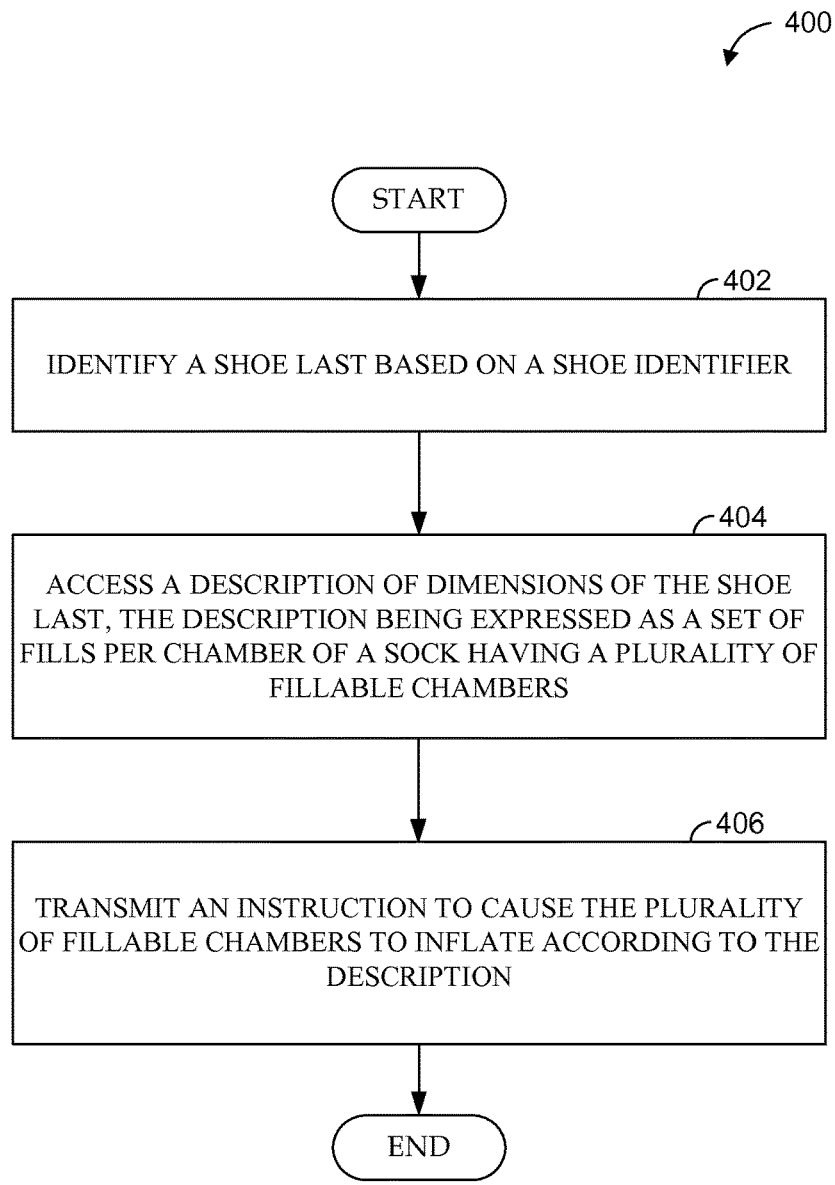
FIG. 4 is a flowchart illustrating an example method, according to various example embodiments.

FIG. 4 is a flowchart illustrating an example method, according to various example embodiments. The method 400 may be performed, in some example embodiments, by the system 200.

In an operation 402, a shoe last used to manufacture a shoe product is identified based on a shoe identifier. For example, using a shoe identifier, a shoe last may be identified by accessing a record correlating a shoe identifier to a shoe last identifier in the database 108 (or the database 210). The shoe identifier may be received by the receiver module 202, for example, from a user 130. The shoe identifier may also identify the shoe product by a manufacturer, a model, and a size of the shoe product.

In an operation 404, a description of the dimensions of the identified shoe last is accessed, the description being expressed as a set of fills per chamber of a sock 128 having a plurality of fillable chambers. The set of fills per chamber may be determined based on the displacement of an inner wall of the sock 128 when the fillable chambers are in an inflated state.

In an operation 406, an instruction to cause the plurality of fillable chambers to inflate according to the accessed description is transmitted (e.g., to a filling station 126). In some example embodiments, the transmitted instruction may comprise the accessed description of the dimensions of the identified shoe last.

Figure 5A:
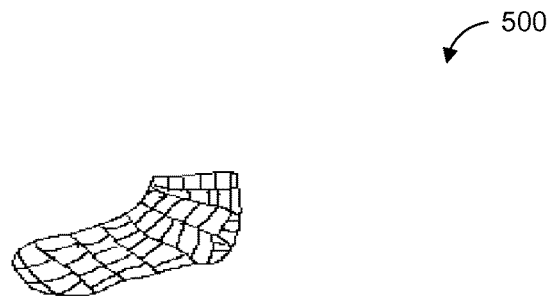
FIGS. 5A, 5B, and 5C are diagrams depicting example inflatable socks for various shoe styles, according to various example embodiments.
Figure 5B:
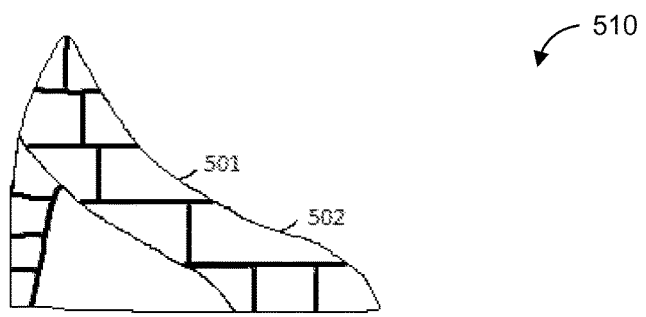
Figure 5C:
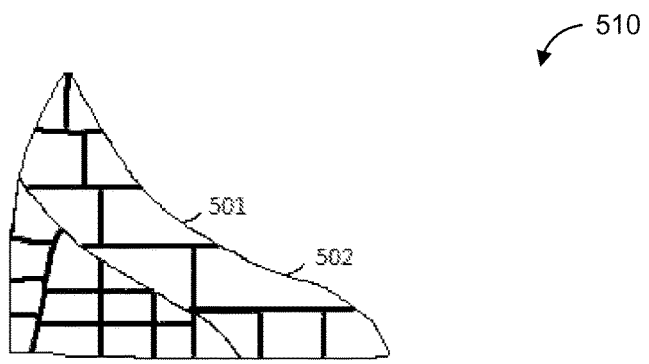

FIGS. 5A, 5B, and 5C are diagrams depicting example inflatable socks 128 for various shoe styles, according to various example embodiments. FIG. 5A illustrates a side view of an example sock 500 showing an example layout of the plurality of fillable chambers. By varying the fills per chamber of the plurality of fillable chambers of the sock 500, the present system may re-create the internal shapes of a plurality of shoes based on the description of the dimensions of a shoe last that corresponds to a respective shoe of the plurality of the shoes. In some example embodiments, the same inflatable sock 128 may be used to re-create the internal shape of a number of different types of shoes, as illustrated in FIG. 5B and FIG. 5C. For example, FIG. 5B depicts a subset of the plurality of the fillable chambers (e.g., fillable chambers 501 and 502) of the sock 510 being inflated to re-create the internal shape of a pump. FIG. 5C depicts another subset of the plurality of the fillable chambers of the sock 510 being inflated to re-create the internal shape of a wedge shoe. The inflating of different subsets of the plurality of fillable chambers may also allow the user 130 to experience a simulated support provided by a particular type of shoe.

Figure 6A:
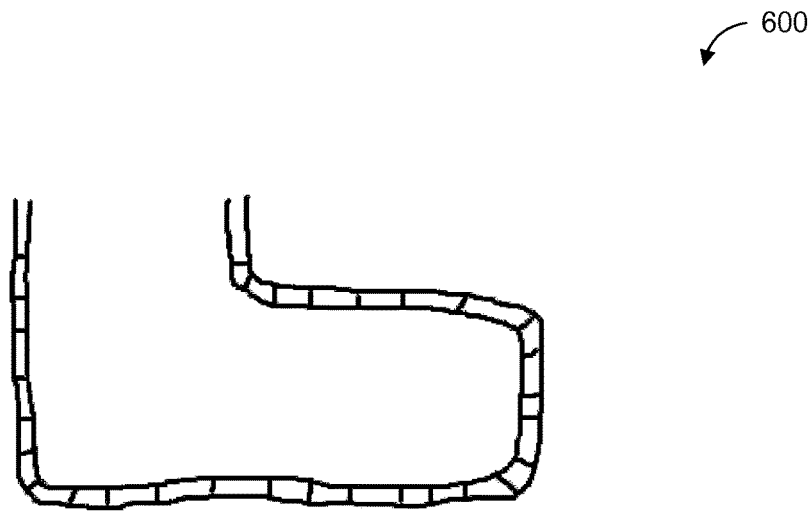
FIGS. 6A and 6B are diagrams depicting cross-sectional views of an inflatable sock in a deflated state and an inflated state, respectively, according to various example embodiments.
Figure 6B:
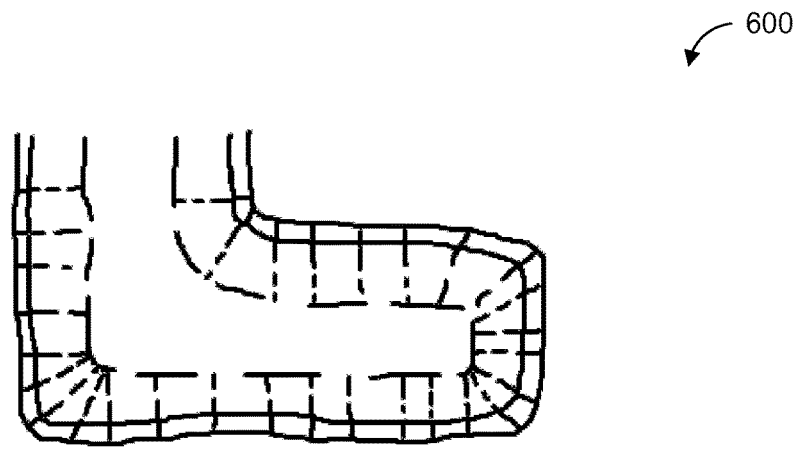

FIGS. 6A and 6B are diagrams depicting cross-sectional views of an inflatable sock in a deflated state and an inflated state, respectively, according to various example embodiments. FIG. 6A depicts an example inflatable sock 600 comprising a plurality of fillable chambers situated between an outer and an inner walls of the sock 600. The sock 600 is depicted in a deflated state (e.g., before the filling station 126 fills the plurality of chambers with a fluid).

FIG. 6B illustrates the sock 600 being in an inflated state. The plurality of the fillable chambers expanded as a result of receiving a fill per chamber according to a description of the dimensions of a shoe last used to manufacture the shoe whose internal shape may be re-created using the inflatable sock 600. FIG. 6B also illustrates the displacement of the inner wall of the sock 600. In some example embodiments, the displacement of the inner wall of the sock 600 when the fillable chambers are in an inflated state may be used to determine the set of fills per chamber that are comprised in the description of the dimensions of a shoe last.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system), or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
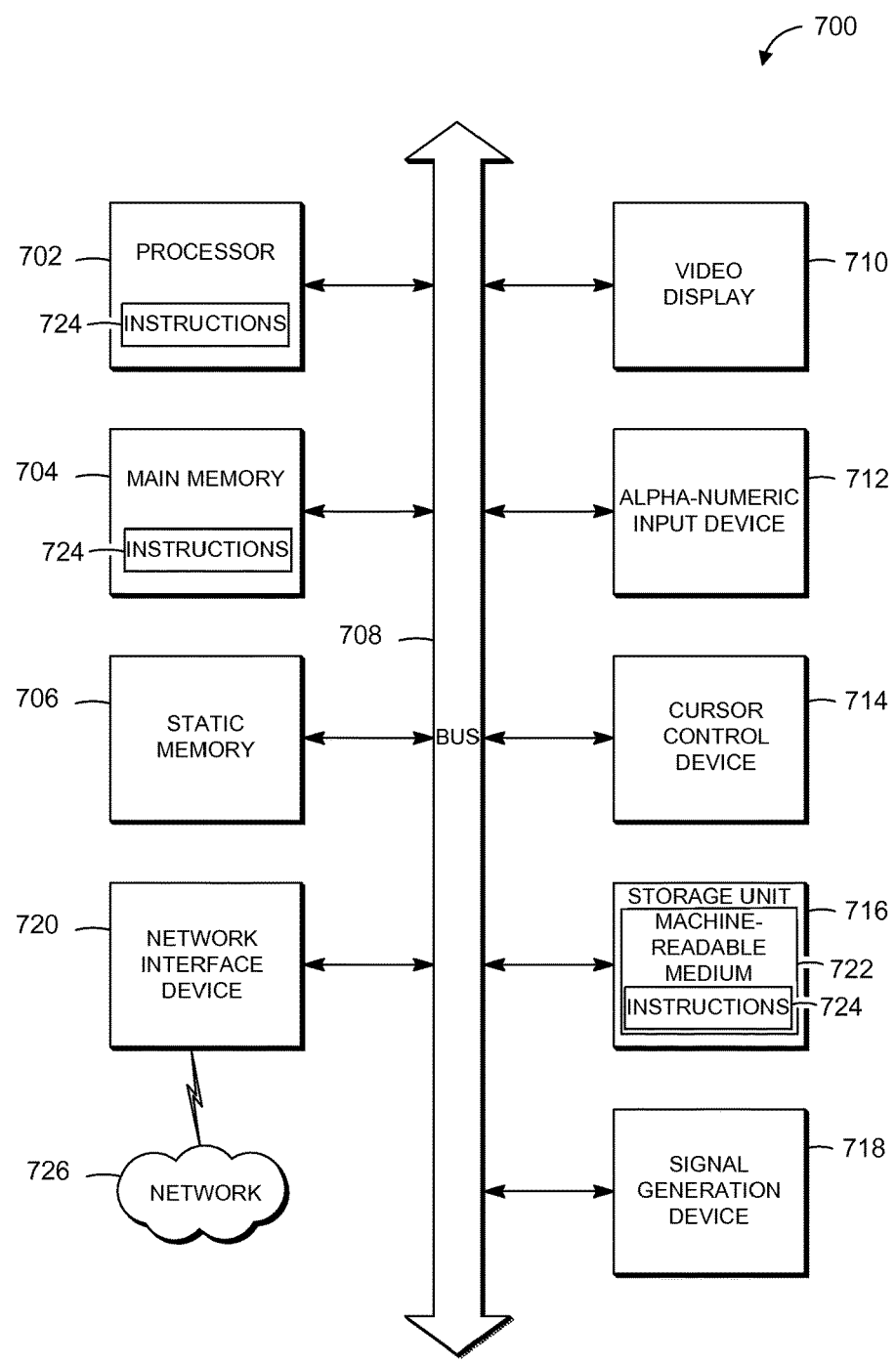
FIG. 7 is a diagrammatic representation of a machine in the example form of a computer system within which a set of instructions, for causing the machine to perform any one or more of the methodologies discussed herein, may be executed.

FIG. 7 is a block diagram of machine in the example form of a computer system 700 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard or a touch-sensitive display screen), a cursor control device 714 (e.g., a mouse), a storage unit 716, a signal generation device 718 (e.g., a speaker), and a network interface device 720.

Machine-Readable Medium

The storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium"

shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more hardware processors; and
   a machine-readable medium for storing instructions that, when executed by the one or more hardware processors, cause the one or more hardware processors to perform operations comprising:
   identifying, at a record of database, a description of an internal shape of a clothing item, the identifying of the description being based on a clothing item identifier associated with the clothing item;
   transmitting an instruction referencing the description of the internal shape of the clothing item to a filling station associated with a fitting device; and
   causing, based on the transmitted instruction, the fitting device to adjust according to the description of the internal shape of the clothing item, the adjusting of the fitting device resulting in a mimicked internal shape of the clothing item.

2. The system of claim 1, wherein the operations further comprise:
   receiving the clothing item identifier that identifies the clothing item by at least one of a manufacturer, a model, or a size of the clothing item.

3. The system of claim 1, wherein:
   the fitting device is inflatable to mimic the internal shape of the clothing item,
   the fitting device includes a plurality of fillable chambers, and
   the description of the internal shape of the clothing item is expressed as a set of fills per chamber of the fitting device.

4. The system of claim 3, wherein the set of fills per chamber are determined based on a displacement of an inner wall of the fitting device when the fillable chambers are in an inflated state.

5. The system of claim 3, wherein the fills per chamber are accessed based on an indication that the fitting device is fillable with a particular fluid.

6. The system of claim 1, wherein the fitting device includes a plurality of fillable chambers, and the description corresponds to a particular size of the clothing item, and wherein the operations further comprise:
   receiving a user-specified characteristic of a fit of a part of the fitting device in relation to a part of a body of a user;
   identifying a further size of the clothing item, the further size corresponding to the user-specified characteristic;
   based on the further size, accessing a further description of the internal shape of the clothing item; and
   transmitting a further instruction to cause the plurality of fillable chambers to inflate according to the further description.

7. The system of claim 1, wherein the fitting device includes a plurality of fillable chambers, and the description corresponds to a particular size of the clothing item, and wherein the operations further comprise:
   receiving a measured distance between a first point on a body of a user wearing the fitting device and a second point on the inner wall of the fitting device, the measured distance being ascertained when the plurality of fillable chambers are in the inflated state;
   determining that the measured distance is outside a range of values indicating a comfortable fit in an area of the first and second points;
   comparing the measured distance and a second range of values indicating a comfortable fit, the second range of values corresponding to a further size of the clothing item;
   accessing a further description of the internal shape of the clothing item based on an outcome of comparing the measured distance and the second range of values; and
   transmitting a further instruction to cause the plurality of fillable chambers to inflate according to the further description.

8. The system of claim 1, wherein the operations further comprise:
   receiving feedback from the user, the feedback regarding a fit of the fitting device in the inflated state.

9. The system of claim 8, wherein the operations further comprise:
   based on the received feedback, recommending one or more clothing items.

10. The system of claim 1, wherein the fitting device includes a plurality of fillable chambers, the description of the internal shape of the clothing item is expressed as a set of fills per chamber of the fitting device, and wherein the operations further comprise:
    receiving a measured distance between a first point on a body of a user wearing the fitting device and a second point on the inner wall of the fitting device, the measured distance being ascertained when the plurality of fillable chambers are in the inflated state;

determining that the measured distance is within a range of values indicating a comfortable fit in an area of the first and second points, and transmitting a communication requesting a response that pertains to a fit of the fitting device to the body of the user.

11. The system of claim 10, wherein the operations further comprise:

receiving the response to the transmitted communication, the response pertaining to a fit of a part of the fitting device;

mapping the part of the fitting device to one or more fillable chambers of the fitting device;

determining a degree of adjustment for each fill per chamber of the one or more fillable chambers based on the response to the transmitted communication; and transmitting a further instruction to cause the fills per chamber of the one or more fillable chambers to adjust according to the degree of adjustment for each fill per chamber of the one or more fillable chambers.

12. The system of claim 11, wherein the description corresponds to a particular size of the clothing item, and wherein the operations further comprise:

receiving an indication that the fit of the fitting device is comfortable to the user based on the fills per chamber of the one or more fillable chambers adjusted according to the further instruction;

identifying a further size of the clothing item based on the adjusted fills per chamber of the plurality of fillable chambers;

mapping the identified further size of the clothing item to one or more clothing items; and transmitting a communication to the user that includes a recommendation of the one or more clothing items.

13. A method comprising:

identifying, at a record of a database, a description of an internal shape of a clothing item, the identifying of the description being based on a clothing item identifier associated with the clothing item;

transmitting an instruction referencing the description of the internal shape of the clothing item to a filling station associated with a fitting device; and causing, based on the transmitted instruction, the fitting device to adjust according to the description of the internal shape of the clothing item, the adjusting of the fitting device resulting in a mimicked internal shape of the clothing item, the causing of the fitting device to adjust being performed using one or more hardware processors.

14. The method of claim 13, further comprising:

receiving the clothing item identifier that identifies the clothing item by at least one of a manufacturer, a model, or a size of the clothing item.

15. The method of claim 13, wherein:

the fitting device is inflatable to mimic the internal shape of the clothing item, the fitting device includes a plurality of fillable chambers, and the description of the internal shape of the clothing item is expressed as a set of fills per chamber of the fitting device.

16. The method of claim 13, wherein the fitting device includes a plurality of fillable chambers, and the description corresponds to a particular size of the clothing item, the method further comprising:

receiving a user-specified characteristic of a fit of a part of the fitting device in relation to a part of a body of a user;

identifying a further size of the clothing item, the further size corresponding to the user-specified characteristic;

based on the further size, accessing a further description of the internal shape of the clothing item; and transmitting a further instruction to cause the plurality of fillable chambers to inflate according to the further description.

17. The method of claim 13, wherein the fitting device includes a plurality of fillable chambers, and the description corresponds to a particular size of the clothing item, the method further comprising:

receiving a measured distance between a first point on a body of a user wearing the fitting device and a second point on the inner wall of the fitting device, the measured distance being ascertained when the plurality of fillable chambers are in the inflated state;

determining that the measured distance is outside a range of values indicating a comfortable fit in an area of the first and second points;

comparing the measured distance and a second range of values indicating a comfortable fit, the second range of values corresponding to a further size of the clothing item;

accessing a further description of the internal shape of the clothing item based on an outcome of comparing the measured distance and the second range of values; and transmitting a further instruction to cause the plurality of fillable chambers to inflate according to the further description.

18. The method of claim 13, further comprising:

receiving feedback from the user, the feedback regarding a fit of the fitting device in the inflated state.

19. The method of claim 18, further comprising:

based on the received feedback, recommending one or more clothing items.

20. A non-transitory machine-readable storage medium comprising computer instructions that, when executed by one or more hardware processors of a system, cause the system to perform operations comprising:

identifying, at a record of a database, a description of an internal shape of a clothing item, the identifying of the description being based on a clothing item identifier associated with the clothing item;

transmitting an instruction referencing the description of the internal shape of the clothing item to a filling station associated with a fitting device; and causing, based on the transmitted instruction, the fitting device to adjust according to the description of the internal shape of the clothing item, the adjusting of the fitting device resulting in a mimicked internal shape of the clothing item.

* * * * *